United States Patent
Kar et al.

(10) Patent No.: US 10,664,561 B1
(45) Date of Patent: May 26, 2020

(54) AUTOMATIC PIPELINING OF MEMORY CIRCUITS

(71) Applicant: Xilinx, Inc., San Jose, CA (US)

(72) Inventors: Pradip K. Kar, San Jose, CA (US); Satyaprakash Pareek, Campbell, CA (US); Shangzhi Sun, San Jose, CA (US); Bing Tian, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 272 days.

(21) Appl. No.: 15/729,483

(22) Filed: Oct. 10, 2017

(51) Int. Cl.
*G06F 17/50* (2006.01)

(52) U.S. Cl.
CPC ........ *G06F 17/5027* (2013.01); *G06F 17/505* (2013.01)

(58) Field of Classification Search
USPC .......................................... 716/134
See application file for complete search history.

(56) References Cited

U.S. PATENT DOCUMENTS

| | | | |
|---|---|---|---|
| 10,020,812 B1 * | 7/2018 | Langhammer ... | H03K 19/17724 |
| 2011/0107290 A1 * | 5/2011 | Lewis ................ | H03K 19/1735 716/128 |

* cited by examiner

*Primary Examiner* — Eric D Lee
(74) *Attorney, Agent, or Firm* — Crawford Maunu PLLC

(57) ABSTRACT

Disclosed approaches of pipelining cascaded memory blocks include determining memory blocks combined to implement a memory in a netlist of a circuit design. A model of the memory blocks arranged in a matrix is generated and a total number of delay registers that can be inserted between an input and an output of the memory is determined based on an input latency constraint. For each column, positions of delay registers are determined between an input of the column and the output of the memory. The circuit design is modified to include the delay registers at the determined positions.

20 Claims, 10 Drawing Sheets

AUTOMATIC PIPELINING OF MEMORY CIRCUITS

TECHNICAL FIELD

The disclosure generally relates to pipelining memory circuits.

BACKGROUND

Programmable logic devices (PLDs) are a well-known type of programmable integrated circuit (IC) that can be programmed to perform specified logic functions. One type of PLD, the field programmable gate array (FPGA), typically includes an array of programmable tiles. These programmable tiles comprise various types of logic blocks, which can include, for example, input/output blocks (IOBs), configurable logic blocks (CLBs), dedicated block random access memory blocks (BRAM), multipliers, digital signal processing blocks (DSPs), processors, clock managers, delay lock loops (DLLs), bus or network interfaces such as Peripheral Component Interconnect Express (PCIe) and Ethernet and so forth.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external programmable read only memory (PROM)) or written into the FPGA by an external device. The collective states of the individual memory cells then determine the function of the FPGA.

Some programmable ICs include separate blocks of memory that can be programmably connected to implement a larger memory. For example, the UltraRAM (URAM) is a high-density FPGA 288-Kbit memory building block in the Xilinx UltraScale+ architecture. The 288-Kbit blocks are cascadable to implement deeper memories. Each URAM has dedicated built-in vertical cascade to create a column of URAMs. Several columns of URAMs can be connected via horizontal cascade circuitry to form a URAM matrix. Note that horizontal cascade can be implemented using lookup tables (LUTs) and flip-flops (FFs) of an FPGA. Several URAMs can be connected to implement deep memories using the cascade connections.

Logic delay accumulates as URAMs are cascaded vertically. Deep cascade structures can result in large clock-to-out delays for access to the memory. To ameliorate the logic delay and support a desired operating frequency, each URAM has built-in pipeline registers that can be programmably enabled. Therefore, achieving optimal pipeline packing is important for high speed memory access.

SUMMARY

In a disclosed method of pipelining cascaded memory blocks in a circuit design, a computer processor determines memory blocks that are combined to implement a memory in a netlist of a circuit design. The computer processor generates a model of the memory blocks arranged in a matrix and determines a total number of delay registers that can be inserted between an input and an output of the memory based on an input latency constraint. For each column, positions of delay registers are determined between an input of the column and the output of the memory. The circuit design is modified to include the delay registers at the positions of the determining step.

A disclosed system for pipelining cascaded memory blocks includes a processor circuit and a memory arrangement coupled to the processor circuit. The memory arrangement is configured with instructions that when executed by the processor circuit cause the processor circuit to determine a plurality of memory blocks combined to implement a memory in a netlist of a circuit design. The instructions further cause the processor circuit to generate in the memory arrangement from the netlist of the circuit design, a model of the plurality of memory blocks arranged in a matrix. The instructions further cause the processor circuit to determine a total number of delay registers that can be inserted between an input and an output of the memory based on a latency constraint and determine for each column, positions of the delay registers in the model between an input of the column and the output of the memory. The positions of the delay registers impose equal latency on paths from the inputs of the columns to the output of the memory. The instructions further cause the processor circuit to modify the circuit design to include the delay registers at the positions.

Other features will be recognized from consideration of the Detailed Description and Claims, which follow.

BRIEF DESCRIPTION OF THE DRAWINGS

Various aspects and features of the disclosed methods and systems will become apparent upon review of the following detailed description and upon reference to the drawings in which.

DETAILED DESCRIPTION

Figure 1:
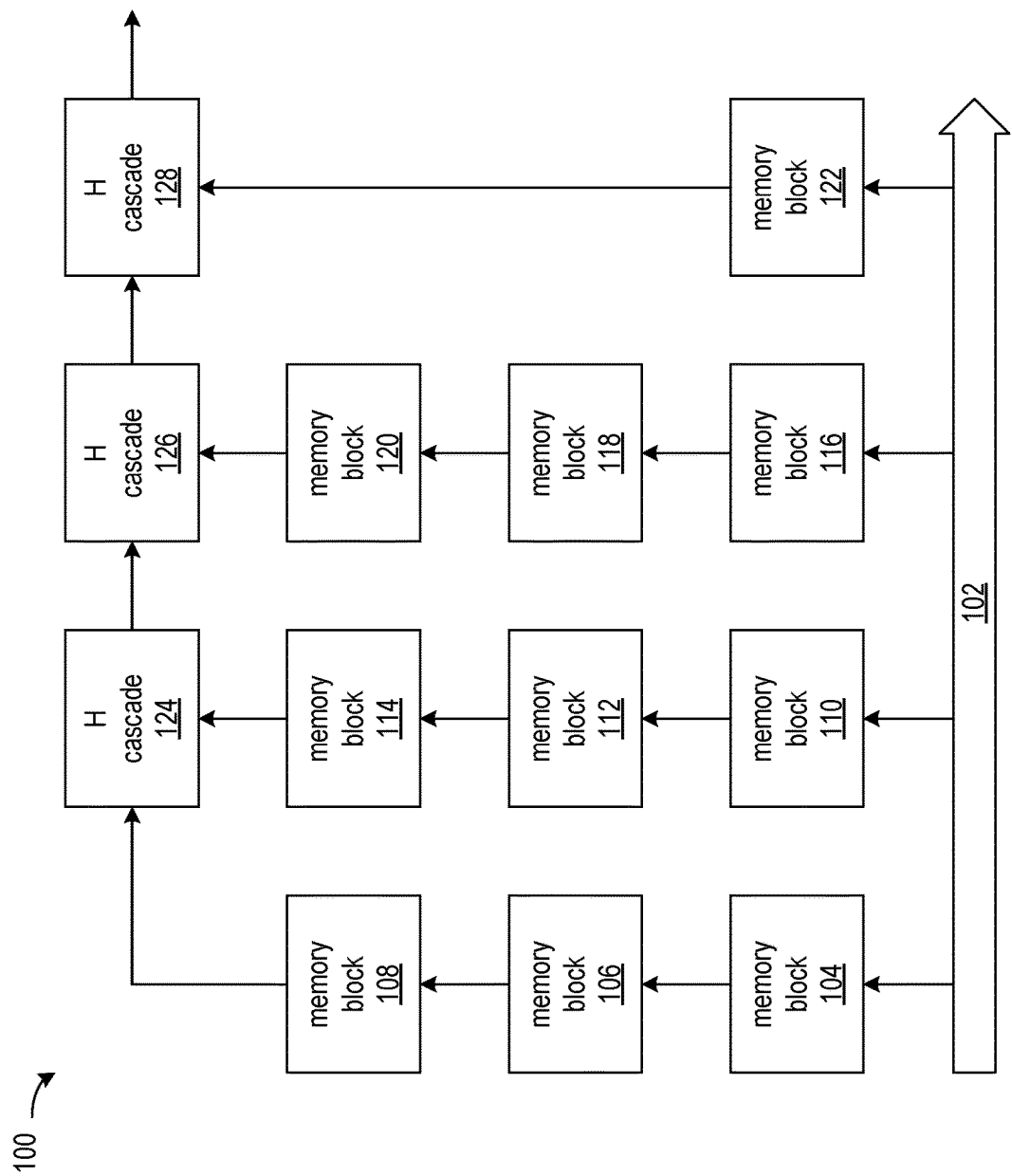
FIG. 1 shows an example of a memory circuit that is implemented by cascaded memory blocks.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

Prior manual approaches for pipelining cascaded memory blocks have been prone to error and have not been scalable to large memories. In order to pipeline cascaded memory blocks, a circuit designer had to manually enable attributes on the memory blocks and balance the latency on each input to output path. Correctly setting the proper attributes in an instantiated netlist can be difficult and time consuming.

The disclosed approaches automate the pipelining of cascaded memory blocks, alleviating the circuit designer from having to edit numerous attributes on of the cascaded memory blocks. For any given memory decomposition, the disclosed approaches ensure that the cascaded memory blocks achieve the highest performance. In a disclosed method, a computer processor identifies in a circuit design, a memory circuit that is defined by multiple blocks of memory connected into a single addressable memory. From the identified blocks of memory, the computer processor generates a model of the memory blocks in computer memory. The model representing the memory blocks is significantly smaller than the circuit design itself, thereby improving performance of the computer during the process of pipelining the memory circuit. The processor determines the total number of delay registers to be added for pipelining based on an input latency constraint. The computer processor operates on the memory model to determine for each column the positions of the delay registers between an input of the column and an output of the memory circuit. Once the positions of the delay registers are determined, the computer processor modifies the circuit design to include the delay registers at the identified positions.

FIG. 1 shows an example of a memory circuit 100 that is implemented by cascaded memory blocks. Address and control signals are carried by address and control bus 102 to the memory blocks 104, 106, 108, 110, 112, 114, 116, 118, 120, and 122. The number and arrangement of memory can vary according to the resources available on a particular programmable IC and applications requirements specified as design constraints.

The connected memory blocks generally form a matrix. Depending on the circuit design, the matrix can have one or more columns and one or more rows. For example, a matrix can have multiple columns and multiple rows of memory blocks, a single column and multiple rows of memory blocks, or multiple columns and a single row of memory blocks. In the exemplary memory circuit 100, memory blocks 104, 106, 108 form a first column, memory blocks 110, 112, and 114 form a second column, memory blocks 116, 118, and 120 form a third column, and memory block 122 forms a fourth column. As can be seen the columns need not have equal numbers of memory blocks. For example, a circuit design may specify a memory circuit having a size that requires 10 memory blocks and constrained to a maximum height of 3 memory blocks. Such a specification would result in the arrangement shown in FIG. 1 of a memory circuit having 3 columns of 3 memory blocks and one column having one memory block.

The memory blocks that form the memory circuit 100 are connected by vertical and horizontal cascade circuitry. The vertical cascade circuitry is represented by the lines that connect the memory blocks in each column, and the horizontal cascade circuitry is represented by blocks 124, 126, and 128. The vertical cascade circuitry selects addressed data from the memory blocks in the column and includes built-in pipeline registers that can be selectively enabled. The horizontal cascade circuitry selects data from the columns. In memory circuits having only a single column, no horizontal cascade circuitry would be necessary.

Figure 2:
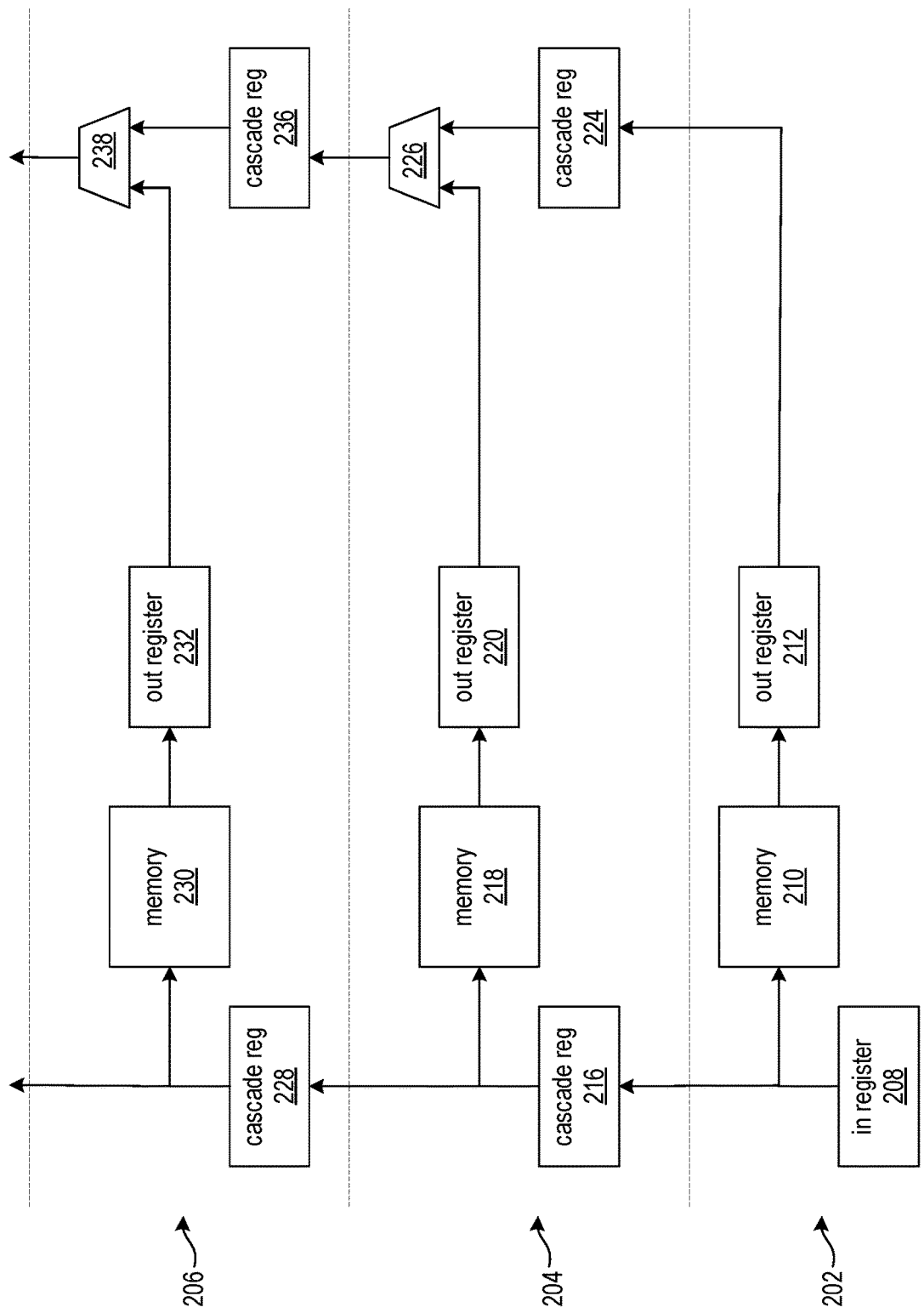
FIG. 2 shows an example of multiple memory blocks connected in a vertical cascade.

FIG. 2 shows an example of memory blocks 202, 204, and 206 connected in a vertical cascade. Each memory block has several built-in pipeline registers that can be enabled using programmable attributes. The programmable attributes can be specified on memory block in the circuit design. The circuit design tool allows a circuit designer to instantiate one or more instances of the memory block in the circuit design and specify values of the attributes for forming a cascade connection of the memory blocks.

The specified attributes can configure input register 208 to register all inputs (data, address, enable etc.) to the first memory block 202 in the cascade. Memory block 202 further includes the memory circuit 210 and output register 212. The output register 212 registers data read from the memory circuit 210.

Additional attributes of a memory block can be configured to specify cascade circuitry in memory blocks 204 and 206. Memory block 204 includes cascade register 216, memory circuit 218, output register 220, cascade register 224, and multiplexer 226. The attributes enable cascade register 216 to store cascaded address, data, and control signals from input register 208, and enable cascade register 224 to store output data from memory block 202. Multiplexer 226 selects output data from the memory circuit 218 or the cascade register 224 based on address controls (not shown) from the cascade register 216.

Similarly, memory block 206 includes cascade register 228, memory circuit 230, output register 232, cascade register 236, and multiplexer 238. The attributes enable cascade register 228 to store cascaded address, data, and control signals from cascade register 216, and enable cascade register 236 to store output data from memory block 204. Multiplexer 238 selects output data from the memory circuit 230 or the cascade register 236 based on address controls (not shown) from the cascade register 228.

Figure 3:
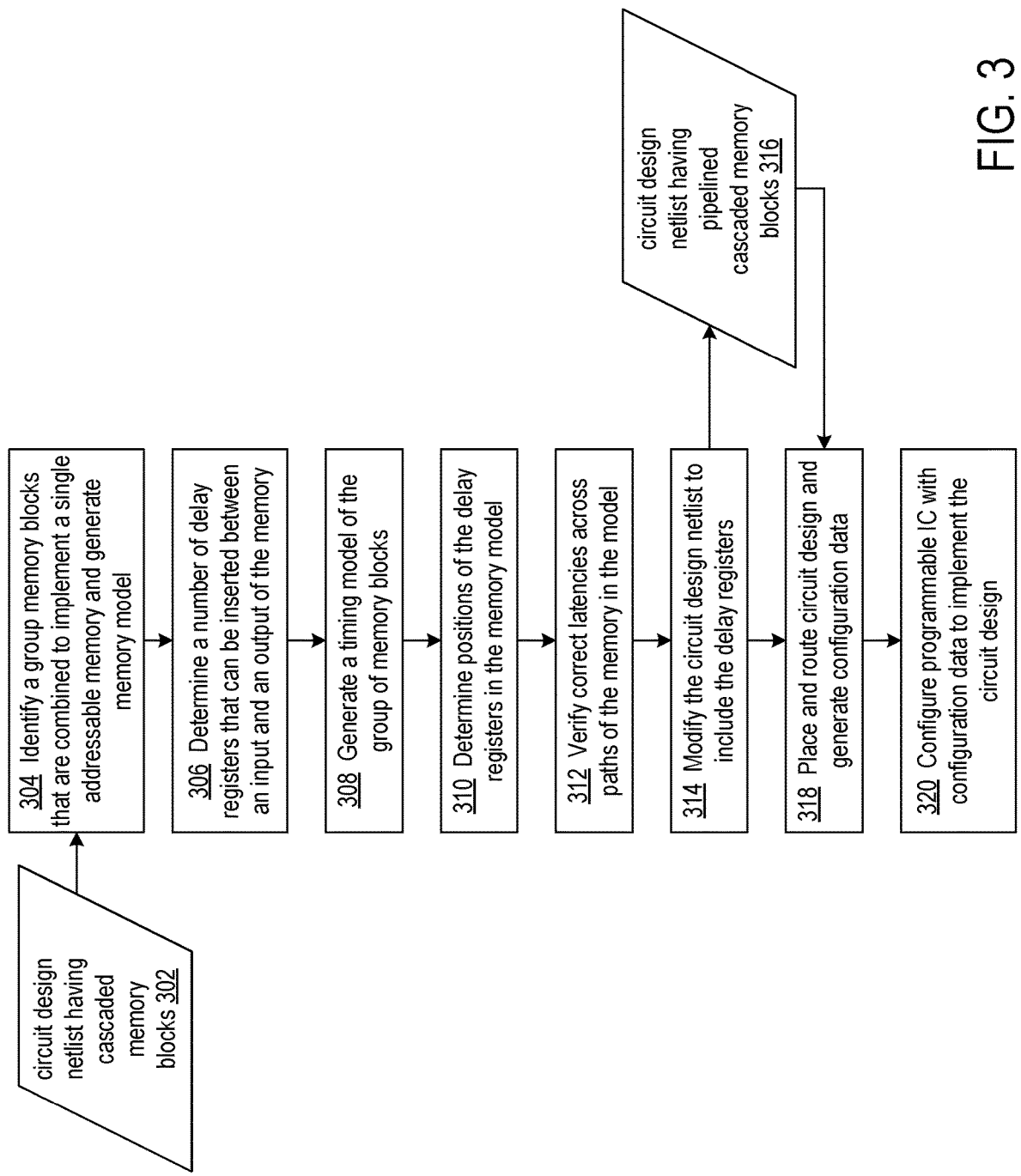
FIG. 3 shows a flowchart of an exemplary process of automatically pipelining a memory circuit that is implemented by cascaded blocks of memory.

FIG. 3 shows a flowchart of an exemplary process of automatically pipelining a memory circuit that is implemented by cascaded blocks of memory. The exemplary circuit design 302 is a netlist having cascaded memory blocks.

At block 304, the computer processor identifies in the netlist each group of memory blocks that are combined to implement a single addressable memory circuit, and generates a memory model of each memory circuit. A memory circuit suitable for automated pipelining can be identified by searching for cascade connections of multiple memory blocks. Determining a memory circuit suitable for pipelining can include searching the netlist design for a vertical cascade connection or horizontal cascade connection of multiple memory blocks.

Figure 4:
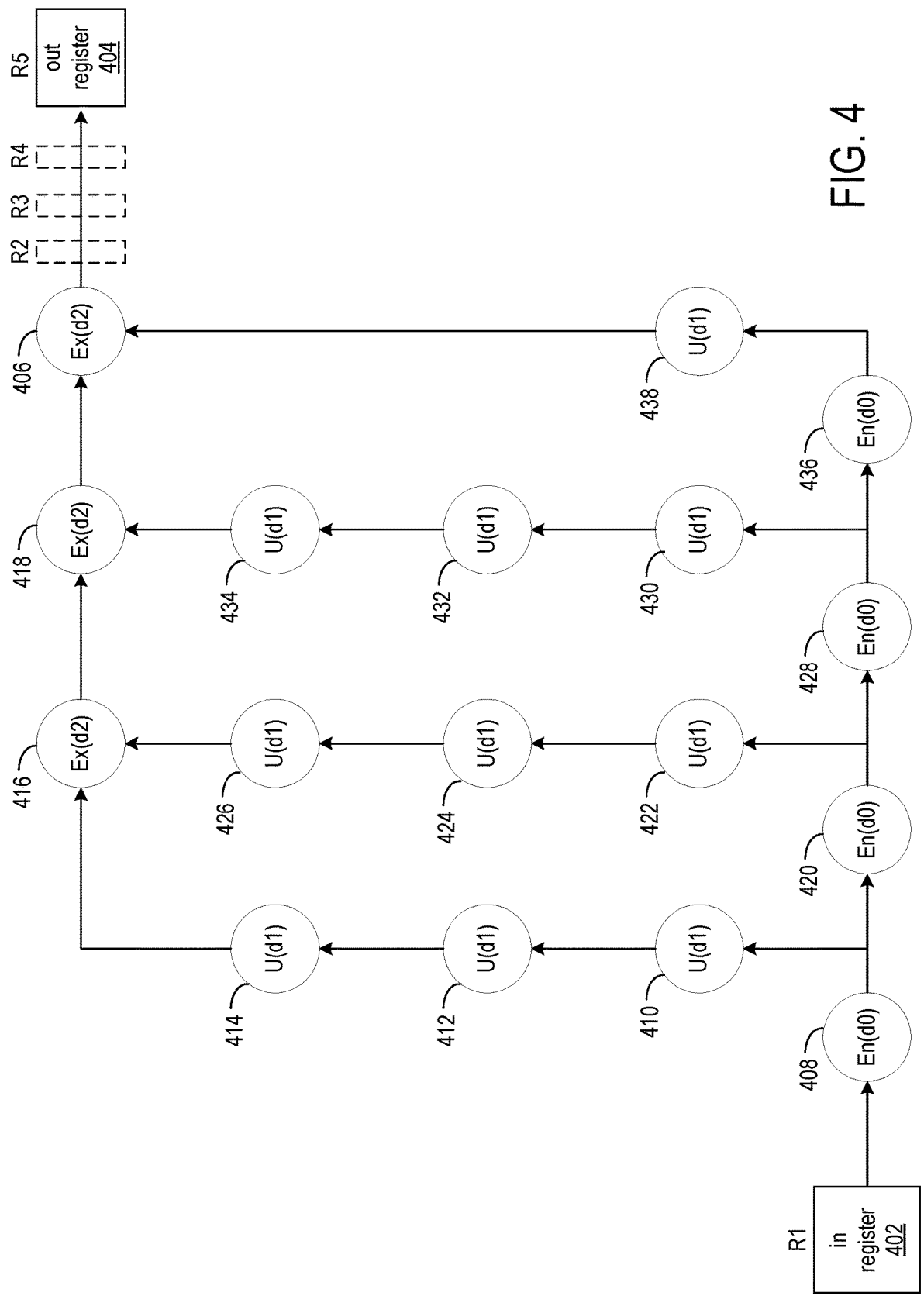
FIG. 4 shows an example in which the process determines that three pipeline delay registers are to be inserted in each path.

Each memory circuit of the circuit design to be pipelined can be represented by a memory model in computer memory. FIG. 4 shows a memory model of the exemplary memory circuit 100 of FIG. 1. The memory model includes vertices that represent input register 402, output register 404, entry logic for each column, memory blocks in each column, and exit logic that selects output from the columns. The respective entry logic is labeled "En(d0)," the memory blocks are labeled "U(d1)," and the exit logic is labeled "Ex(d2)." Each entry logic element carries address, data, and control signals from the input register 402 to the individual memory blocks U(d1). The "(dx)" notation indicates the delays of the logic. The edges in the memory model represent connections between the input register, entry logic, memory blocks, exit logic, and output register. The memory model of the memory circuit is much smaller than the netlist of the circuit design 302, which significantly reduces the processing and storage requirements of the pipelining process on the host computer system.

Different blocks of circuitry can have different delays. Entry logic circuits are assumed to have a delay of 0. The memory blocks and exit logic are assumed to have a delay of 1 unit. The delay values of different vertices of the same type can be different. However, for simplicity, the delay values are uniform across a particular type of vertex. The delay values can be configurable, which allows control of the relative pipeline register locations in the matrix. For example, if the input netlist has an insufficient number of registers, it may be desirable to insert 1 register for every 2 memory blocks, and 1 register for every 1 exit logic element.

As a part of setting up the netlist for pipelining, the process identifies potential positions of pipeline registers in the matrix of memory blocks. The horizontal cascade circuitry can include multiple LUTs and FFs, and any connection within the horizontal cascade circuitry is not a candidate. The positions are marked with transient markers that are used in cross-probing between the full netlist of the circuit design and the positions determined for the pipeline delay registers (block 310). Once the reduced model netlist is generated, the full netlist is analyzed for available registers at the memory output for pipeline potential. The available output registers are analyzed for legalization with respect to pipeline feasibility. The feasibility checks include control signal compatibility and register enable pipelines. The control signals Clock, Enable, Reset could be incompatible with the pipeline registers. The available registers that represent pipeline are controlled by Enable. For proper synchronization, not only the data, but also the enable also has to be delayed by equal cycles. The circuit that delays the enable signal is called "enable pipeline." For example, for a 3 stage pipeline, R0→R1→R2, the data at R2 is delayed by 2 clock cycles with respect to R0. Thus, the Enable of R2 is also delayed by 2 cycles with respect to Enable of R0. Before the pipeline starts, pipeline analysis is performed to indicate to the designer the number of registers to be added to achieve maximum performance. The user can update the design and re-run the process. For maximum performance, every URAM can be pipelined. The optimal number of registers is one more than the total path length along the longest path from input to output.

Returning now to FIG. 3, at block 306, the process determines a total number of delay registers that can be inserted between an input and an output of the memory based on an input latency constraint. The latency constraint can be an input value provided by the circuit designer to indicate the frequency at which the memory circuit is expected to process each access request. For example, the memory circuit may be required to process access request at a frequency of 800 MHz.

FIG. 4 shows an example in which the process determines that three pipeline delay registers are to be inserted in each path. The three registers are illustrated as dashed blocks R2, R3, and R4. R1 is the label of the input register 402, and R5 is the label of the output register 404. The initial position of the registers R2, R3, and R4 is between output register R5 and the last exit logic element 406.

The automated pipelining process determines positions of the three exemplary pipeline delay registers in each of the paths from the input register 402, through the columns of memory blocks, to the output register 404 and balances the latency across the different paths. Latency is defined by total number of clock cycles needed for data to propagate from input to output. The exemplary memory model has four paths. The first path flows from input register 402 to output register 404, through entry logic element 408, through memory blocks 410, 412, and 414, and through exit logic elements 416, 418, and 406. The second path flows from input register 402 to output register 404 through entry logic elements 408 and 420, through memory blocks 422, 424, and 426, and through exit logic elements 416, 418, and 406. The third path flows from input register 402 to output register 404 through entry logic elements 408, 420, and 428, through memory blocks 430, 432, and 434, and through exit logic elements 418 and 406. The fourth path flows from input register 402 to output register 404 through entry logic elements 408, 420, 428, and 436 through memory block 438 and through exit logic element 406.

Returning now to FIG. 3, at block 308 a lightweight timing model (e.g., FIG. 6) is generated to represent the timing characteristics of the elements of the memory circuit. The timing model stores information that captures the delay of the entry logic elements, memory blocks, and exit logic elements. The timing model can be a graph having vertices representing the pipeline delay registers to be inserted and edges having associated values that represent delays between the registers. The delays between the registers are the accumulation of delays of the elements between the registers. For example, the delay between R1 and R2 in FIG. 4 is the accumulation of delays of entry logic element 408, memory blocks 410, 412, 414, and exit logic elements 416, 418, and 406. The timing model can also capture additional constraints, such as for a particular target device two consecutive pipeline delay registers are not allowed between two memory blocks. In a generic netlist pipeline solution, any number of consecutive registers might be present between two combinatorial elements. However, for columns of URAM memory blocks, there is fixed number of pipeline attributes, and inserting native register primitives between two URAMs in cascade is not possible.

The timing model is provided as input to block 310 for determining the positions of the delay registers in the paths of the memory circuit. Instead of solving the pipeline problem on the netlist 302 of the complete circuit design, the process operates on the very small representative timing model and provides annotations that can be used to modify the original circuit design netlist. Because the timing model encapsulates all constraints of feasible pipeline positions and delays without the excess information of the complete netlist 302, the disclosed approach to solving the pipelining problem is fast and scalable.

At block 310, the process determines the positions of the delay registers in the paths of the memory circuit. The possible positions of the registers are between the entry logic and first memory block in a column, between memory blocks in a column, between the last memory block in a column and the exit logic, between exit logic elements, and between the last exit logic element and the output register. The positions of the registers in the paths of the memory impose equal latency on the different paths between the input register and the output register. The pipeline delay registers are positioned to achieve a balanced distribution of registers while maintaining equal latency along all paths from input to the output of the memory. As a memory circuit can have different numbers of memory blocks in different columns, the paths from the input to the output of the memory can have different numbers of vertices. If one of the paths has fewer vertices than the other paths in the memory circuit, pipeline delay registers can be accumlated at end of the path.

In determining the positions of the registers, the initial positions of the registers are at the input of the output register (as shown in FIG. 4), and the registers are pushed back from the output register such that a maximum delay between any two registers is minimized. A combination of retiming and path balancing is performed. Markers are recognized to maintain legal positions of registers, and equal numbers of registers are positioned along all the paths from the input to the output. A Bellman Ford algorithm can be used to find the positions of registers.

Figure 5:
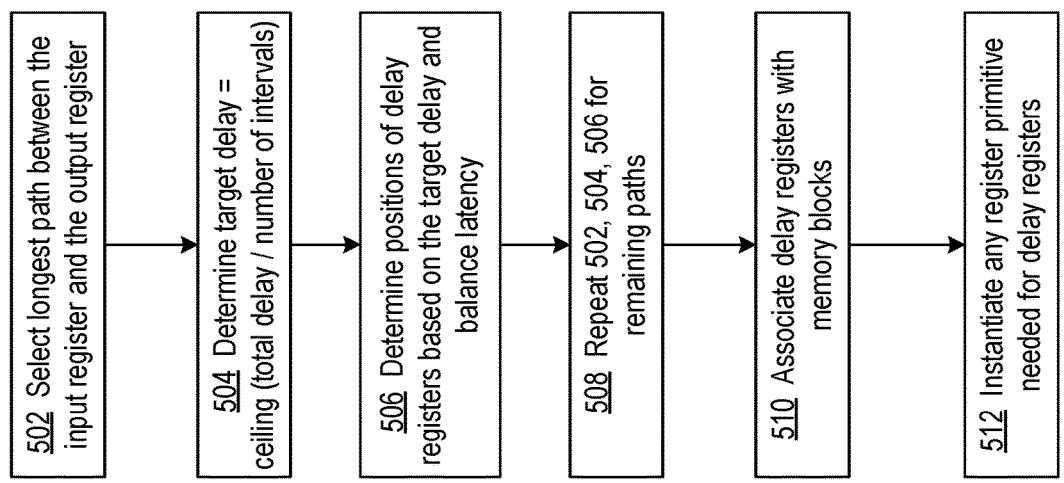
FIG. 5 shows a flowchart of a process of determining the positions of the pipeline delay registers.
Figure 6:
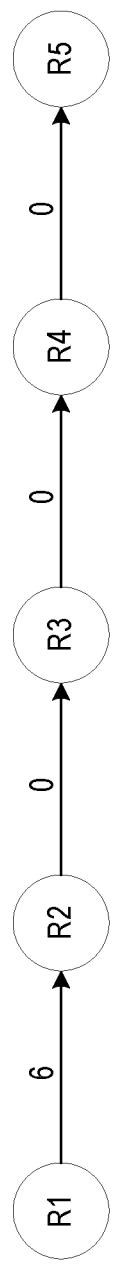
FIG. 6 shows a part of the timing model that represents the longest path.

A process of determining the positions of the pipeline delay registers is shown in FIG. 5. The process commences at block 502 by selecting the longest path from the input register to the output register of the memory circuit. For example, in FIG. 4, the longest path includes entry logic element 408, memory blocks 410, 412, 414, and exit logic elements 416, 418, and 406. FIG. 6 shows a part of the timing model that represents the longest path. The vertices represent the registers R1, R2, R3, R4, and R5, and the edges have associated values that represents the total delay between each pair of connected registers. The initial delay between register R1 and R2 is 6 units, which is the total delay of memory blocks 410, 412, 414 and exit logic elements 416, 418, and 406. Logic element 408 is assumed to have a delay of 0 units, and memory blocks 410, 412, 414 and exit logic elements 416, 418, and 406 are assumed to have respective delays of 1 unit. As there is no logic between registers R2 and R3, between R3 and R4, and between R4 and R5, the delay between the pairs of registers is 0 units.

Returning now to FIG. 5, at block 504 the process determines a target delay value as a function of the total delay from the input register, which models the input of the memory, to the output register, which models the output of the memory, in the longest path and the number of intervals between the delay registers. In the example of FIG. 6, the total delay is 6 units. The number of intervals is the number of edges between the vertex that represents the input register and the vertex that represents the output register in the timing model, which in the example of FIG. 6 is 4 intervals. In one implementation, the function for computing the target delay is:

target delay=ceil(total delay/number of intervals)

The "ceil" function returns the smallest integer that is greater than or equal to total delay/number of intervals (i.e., rounds up the nearest integer). In the example of FIG. 6, ceil (6/4)=2.

At block 506 of FIG. 5, the process determines the positions of the delay registers based on the target delay. The process attempts to evenly distribute the pipeline delay registers over the path and does so using the target delay value. In the example of FIG. 6, to achieve a target delay of 2 units between R1 and R2. R2 needs to be moved back toward R1 by 4 delay units, as the initial delay between R1 and R2 is 6 units (2=6−4). In other words, the number of delay units to move a register is:

move amount=target delay−current delay

In the example, 2 delay units−6 delay units=−4 delay units. The negative value indicates a backwards move of the register. After marking R2 to be moved back 4 delay units, with reference to FIG. 4, R2 will be positioned between memory blocks 412 and 414, as each of memory block 414 and exit logic elements 416, 418, and 406 are assumed to introduce 1 delay unit.

Continuing with the example, after moving R2−4 delay units, the new delay between R2 and R3 is 4 delay units. To achieve a target delay of 2 delay units between R2 and R3, R3 needs to be moved back 2 delay units, which in FIG. 4 positions R3 between exit logic elements 416 and 418. After moving R3, the delay between R3 and R4 is 2 delay units, which is the delay introduced by exit logic elements 418 and 406.

Figure 7:
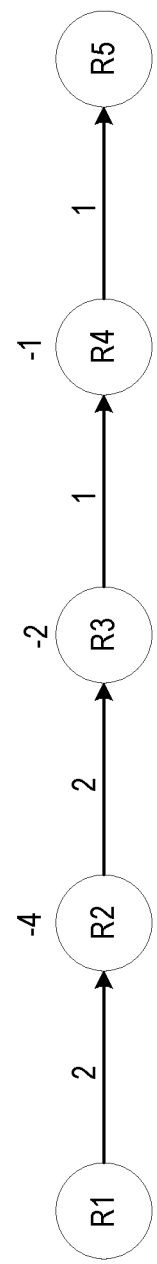
FIG. 7 shows the state of the timing model of FIG. 6 after moving R2 back by 4 delay units, moving R3 back by 2 delay units, and moving R4 back by 1 delay unit.

FIG. 7 shows the state of the timing model of FIG. 6 after moving R2 back by 4 delay units, moving R3 back by 2 delay units and moving R4 back by 1 delay unit. Note that in processing the longest path, R4 need not be moved as the delay between R3 and R4 is 2 delay units, which is equal to the target delay. R4 may be moved, however, as there are multiple feasible solutions. Although a target is achieved, considering there is surplus of registers at end of the path and there is room for R4 inside the path, R4 may be moved. At block 508, the process of blocks 502, 504, and 506 is repeated for the remaining unprocessed paths of the memory circuit.

The latency is balanced across the paths by positioning the same number of delay registers in each path. In some implementations, the memory blocks have built-in pipeline registers that can be selectively enabled. Based on the positions determined for the pipeline delay registers at block 506 some of the pipeline delay registers can be implemented by enabling the built-in pipeline registers. For positions at which there are no built-in pipeline registers available, register primitives can be instantiated to implement pipeline delay registers. A register primitive is a design object that represents single bit synchronous storage element. At block 510, register primitives are optionally instantiated to balance the latency across paths of the memory circuit.

Figure 8:
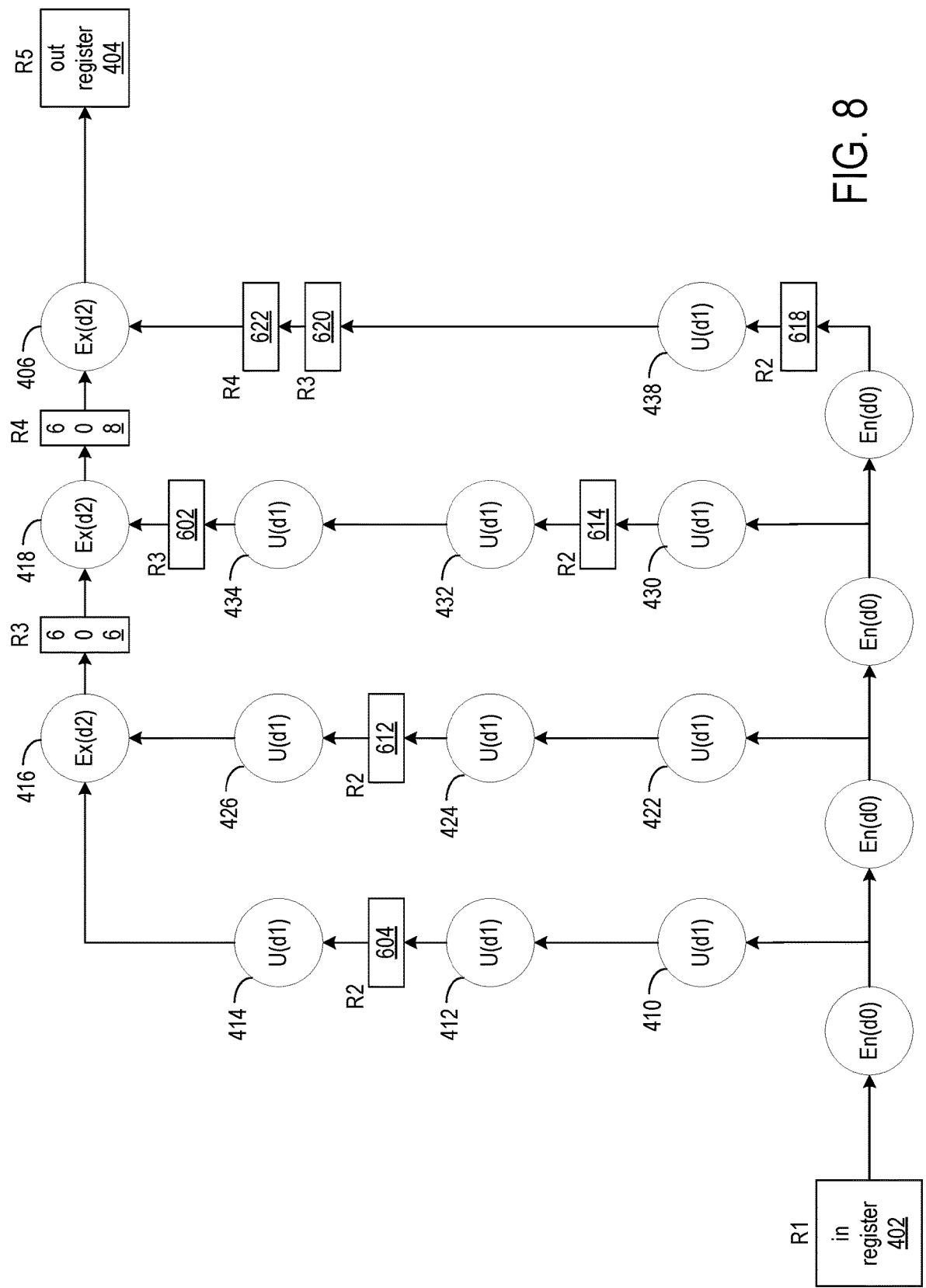
FIG. 8 shows the memory model of FIG. 4 having pipeline delay registers positioned to achieve the desired latency and having the latency balanced between paths of the memory circuit.

FIG. 8 shows the memory model of FIG. 4 having pipeline delay registers positioned to achieve the desired latency and having the latency balanced between paths of the memory circuit. Two URAMs in cascade increase the "delay" and may not increase latency. Before pipelining, the delay along column having 4 memory blocks is greater than the delay along the column having one memory block. However, the paths have equal latency. This is to ensure irrespective of which URAM is read, the output arrives at exact same clock cycle.

Pipeline delay registers 604, 612, 614, and 618 correspond to R2 in FIG. 4; pipeline delay registers 606, 602 and 620 correspond to R3; and pipeline delay registers 608 and 622 correspond to R4. Pipeline delay registers 604, 612, 614, and 618 can be implemented by built-in pipeline registers of the memory blocks 414, 426, 432 and 438. Returning to FIG. 5, at block 510 those pipeline delay registers at positions that are inputs to memory blocks are associated with the memory blocks such that those pipeline delay registers are tagged to be implemented by the built-in pipeline registers. Pipeline delay register 604 is tagged as being associated with memory block 414, pipeline delay register 612 is tagged as being associated with memory block 426, pipeline delay register 614 is tagged as being associated with memory block 432, and pipeline delay register 618 is tagged as being associated with memory block 438. Pipeline delay registers 602, 606, 608, 620 and 622 cannot be implemented by built-in pipeline registers because the registers are not positioned as inputs to a memory block. Therefore, the pipeline delay registers 602, 606, 608, 620 and 622 are instantiated as register primitives, as shown by block 512.

Returning now to FIG. 3, at block 312 the process verifies that the memory model has correct latencies across all paths from the input register of the memory model to the output register of the memory model. The verification computes latency on each vertex of the model as latency on the input path plus the number of pipeline delay registers stages associated with that vertex. All input paths leading into a vertex are asserted to have equal latencies. For one "read" operation, one of the memory blocks from the column will be accessed, and a latency of 1 unit is incurred. Total latency on any path is 1 unit plus the number of pipeline delay registers. Along any path from input to output the latency=4 for FIG. 8.

The process continues at block 314 only if latency verification passes.

At block 314, the process modifies circuit design 302, resulting in circuit design 316. Based on memory model having the pipeline delay registers positioned in the matrix of memory blocks and each register either tagged to be implemented as a built-in pipeline register of a memory block or a register primitive, the circuit design netlist 302 is modified to enable the built-in registers and instantiate any register primitives.

In an exemplary implementation involving URAM memory blocks, attributes of a memory block can be configured to enable the built-in pipeline registers. In such an implementation, for each URAM memory block in the memory model, the corresponding instance from netlist is fetched. The URAM instance is reconfigured with a corresponding pipeline attribute if the URAM memory block in the memory model has an associated pipeline delay register. For pipeline delay registers that are not associated with a memory block, instances of register primitives are created in the netlist.

Figure 9:
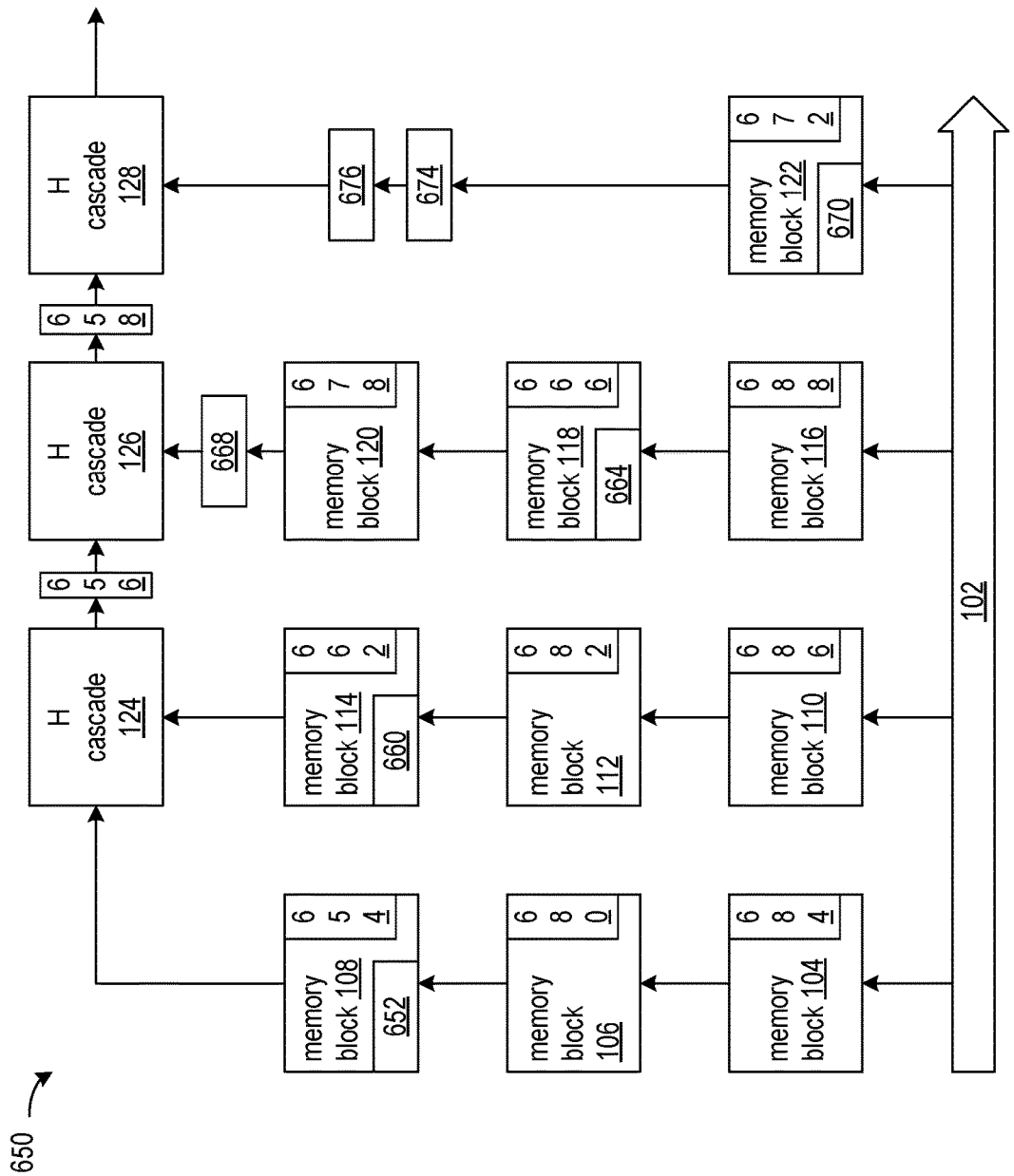
FIG. 9 shows an exemplary memory circuit resulting from automated pipelining of the memory circuit of FIG. 1.

FIG. 9 shows an exemplary memory circuit 650 resulting from automated pipelining of the memory circuit of FIG. 1. Built-in pipeline registers are enabled in the memory blocks 108, 114, 118, and 122 to implement the pipeline delay registers 604, 612, 614, and 618 shown the memory model of FIG. 8. Input register 652 is enabled in memory block 108 to implement the pipeline delay register 604 (FIG. 8), cascade register 660 is enabled in memory block 114 to implement the pipeline delay register 612 (FIG. 8), cascade register 664 is enabled in memory block 118 to implement the pipeline delay register 614 (FIG. 8), and input register 670 is enabled in memory block 122 to implement the pipeline delay register 618 (FIG. 8). Registers 654, 662, 666, 672, 678, 680, 682, 684, 686, and 688 are registers enabled by an output register attribute associated with the memory blocks. The output registers can be enabled for all memory blocks.

Register 656 implements the pipeline delay register 606 from FIG. 8, register 658 implements the pipeline delay register 608 from FIG. 8, register 668 implements the pipeline delay register 602 from FIG. 8, register 674 implements the pipeline delay register 620 from FIG. 8, and register 676 implements the pipeline delay register 622 from FIG. 8.

Returning now to FIG. 3, at block 318 the circuit design 316 having the pipelined cascaded memory blocks can be placed and routed using recognized integrated circuit design tools. The circuit design tools can also generate configuration data for manufacturing an application specific integrated circuit (ASIC) or configuration data for configuring a programmable IC. At block 320, an ASIC can be manufactured using recognized processes or a programmable IC can be configured with the configuration data, thereby creating a circuit that operates according to the circuit design as modified to include the pipelined, cascaded memory blocks.

Figure 10:
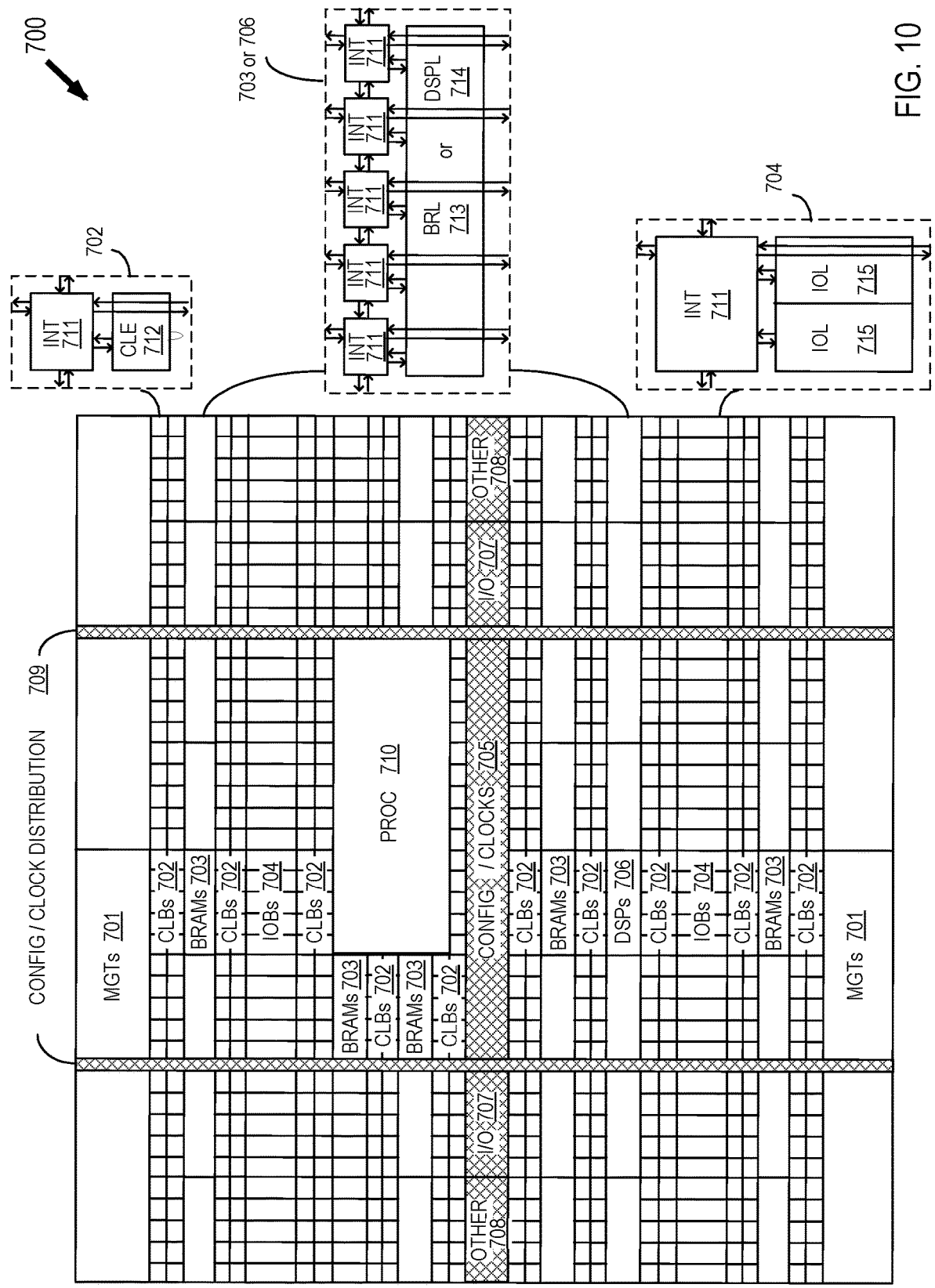
FIG. 10 shows a programmable integrated circuit (IC) on which the disclosed circuits and processes may be implemented.

FIG. 10 shows a programmable integrated circuit (IC) 700 on which the disclosed circuits and processes may be implemented. The programmable IC may also be referred to as a System On Chip (SOC) that includes field programmable gate array logic (FPGA) along with other programmable resources. FPGA logic may include several different types of programmable logic blocks in the array. For example, FIG. 10 illustrates programmable IC 700 that includes a large number of different programmable tiles including multi-gigabit transceivers (MGTs) 701, configurable logic blocks (CLBs) 702, random access memory blocks (BRAMs) 703, input/output blocks (IOBs) 704, configuration and clocking logic (CONFIG/CLOCKS) 705, digital signal processing blocks (DSPs) 706, specialized input/output blocks (I/O) 707, for example, clock ports, and other programmable logic 708 such as digital clock managers, analog-to-digital converters, system monitoring logic, and so forth. Some programmable IC having FPGA logic also include dedicated processor blocks (PROC) 710 and internal and external reconfiguration ports (not shown).

In some FPGA logic, each programmable tile includes a programmable interconnect element (INT) 711 having standardized connections to and from a corresponding interconnect element in each adjacent tile. Therefore, the programmable interconnect elements taken together implement the programmable interconnect structure for the illustrated FPGA logic. The programmable interconnect element INT 711 also includes the connections to and from the programmable logic element within the same tile, as shown by the examples included at the top of FIG. 10.

For example, a CLB 702 can include a configurable logic element CLE 712 that can be programmed to implement user logic, plus a single programmable interconnect element INT 711. A BRAM 703 can include a BRAM and/or URAM logic element (BRL) 713 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 706 can include a DSP logic element (DSPL) 714 in addition to an appropriate number of programmable interconnect elements. An IOB 704 can include, for example, two instances of an input/output logic element (IOL) 715 in addition to one instance of the programmable interconnect element INT 711. As will be clear to those of skill in the art, the actual I/O bond pads connected, for example, to the I/O logic element 715, are manufactured using metal layered above the various illustrated logic blocks, and typically are not confined to the area of the input/output logic element 715.

In the pictured embodiment, a columnar area near the center of the die (shown shaded in FIG. 10) is used for configuration, clock, and other control logic. Horizontal areas 709 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 10 include additional logic blocks that disrupt the regular columnar structure making up a large part of the programmable IC. The additional logic blocks can be programmable blocks and/or dedicated logic. For example, the processor block PROC 710 shown in FIG. 10 spans several columns of CLBs and BRAMs.

Note that FIG. 10 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 10 are purely exemplary. For example, in an actual programmable IC, more than one adjacent column of CLBs is typically included wherever the CLBs appear, to facilitate the efficient implementation of user logic.

Figure 11:
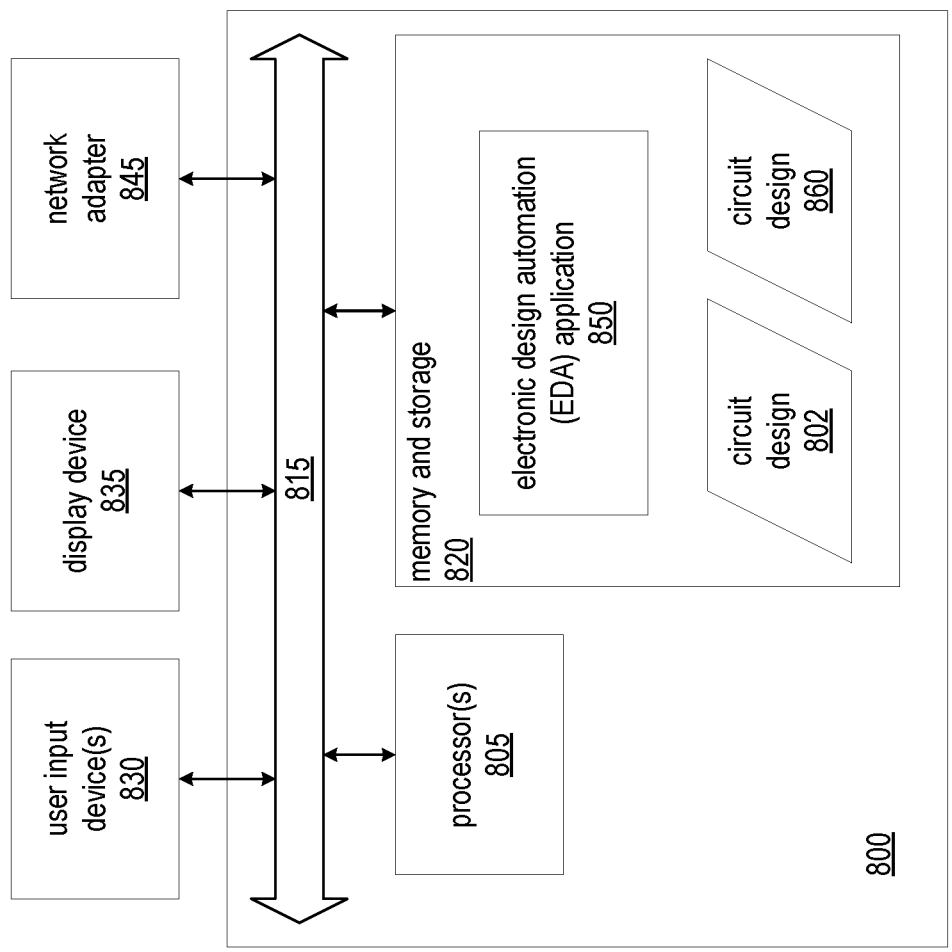
FIG. 11 is a block diagram illustrating an exemplary data processing system.

FIG. 11 is a block diagram illustrating an exemplary data processing system (system) 800. System 800 is an example of an EDA system. As pictured, system 800 includes at least one processor circuit (or "processor"), e.g., a central processing unit (CPU) 805 coupled to memory and storage arrangement 820 through a system bus 815 or other suitable circuitry. System 800 stores program code and circuit design 802 within memory and storage arrangement 820. Processor 805 executes the program code accessed from the memory and storage arrangement 820 via system bus 815. In one aspect, system 800 is implemented as a computer or other data processing system that is suitable for storing and/or executing program code. It should be appreciated, however, that system 800 can be implemented in the form of any system including a processor and memory that is capable of performing the functions described within this disclosure.

Memory and storage arrangement 820 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 800 may also include one or more cache memories (not shown) that provide temporary storage of at least some program code and data in order to reduce the number of times program code and data must be retrieved from local memory and persistent storage during execution.

Input/output (I/O) devices such as user input device(s) 830 and a display device 835 may be optionally coupled to system 800. The I/O devices may be coupled to system 800 either directly or through intervening I/O controllers. A network adapter 845 also can be coupled to system 800 in order to couple system 800 to other systems, computer systems, remote printers, and/or remote storage devices through intervening private or public networks. Modems, cable modems, Ethernet cards, and wireless transceivers are examples of different types of network adapter 845 that can be used with system 800.

Memory and storage arrangement 820 may store an EDA application 850. EDA application 850, being implemented in the form of executable program code, is executed by processor(s) 805. As such, EDA application 850 is considered part of system 800. System 800, while executing EDA application 850, receives and operates on circuit design 802. In one aspect, system 800 performs a design flow on circuit design 802, and the design flow may include synthesis, mapping, placement, routing, and the application of one or more memory pipelining techniques as described herein. System 800 generates an optimized, or modified, version of circuit design 100 as circuit design 860.

EDA application 850, circuit design 802, circuit design 860, and any data items used, generated, and/or operated upon by EDA application 850 are functional data structures that impart functionality when employed as part of system 800 or when such elements, including derivations and/or modifications thereof, are loaded into an IC such as a programmable IC causing implementation and/or configuration of a circuit design within the programmable IC.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for pipelining cascaded memory circuits. Other aspects and features will be apparent to those skilled in the art from consideration of the specification. It is intended that the specification and drawings be considered as examples only, with a true scope of the invention being indicated by the following claims.

What is claimed is:

1. A method comprising:
    determining a plurality of memory blocks combined to implement a memory in a netlist of a circuit design;
    generating, by a computer processor from the netlist of the circuit design, a model in a computer memory of the plurality of memory blocks arranged in a matrix having a plurality of columns;
    determining a total number of delay registers that can be inserted between an input register and an output register of the memory based on a latency constraint;
    determining, by the computer processor for each column of the plurality of columns, positions of the delay registers in the model between an input of the column and the output register of the memory, wherein the positions of the delay registers impose equal latency on paths from the inputs of the columns to the output register of the memory; and
    modifying the circuit design by the computer processor to include the delay registers at the positions.

2. The method of claim 1, wherein the determining the plurality of memory blocks that implement the memory includes searching the netlist of the circuit design for at least one vertical cascade connection of memory blocks.

3. The method of claim 1, wherein the generating the model includes:
    generating vertices that represent the input register of the memory, output register of the memory, delay registers, and memory blocks; and
    generating edges that connect the vertices and that represent connections between the input register of the memory, output register of the memory, the delay registers, and the memory blocks in the circuit design.

4. The method of claim 1, wherein:
    the determining the plurality of memory blocks that implement the memory includes searching the netlist of the circuit design for a horizontal cascade connection of memory blocks; and
    the generating the model includes:
        generating vertices that represent the input register, output register, delay registers, horizontal cascade connection, and the memory blocks, and
        generating edges that connect the vertices and that represent connections between the input register, output register, delay registers, and the memory blocks in the circuit design.

5. The method of claim 1, wherein the determining positions of delay registers includes generating a timing graph having vertices representing the delay registers to be inserted and edges having associated values that represent delays between the delay registers.

6. The method of claim 1, further comprising verifying, after determining the positions of the delay registers in the model, equal latencies of paths from the input to the output of the memory.

7. The method of claim 1, wherein the modifying the circuit design includes configuring attributes of one or more of the memory blocks to enable a respective built-in pipeline register of the one or more memory blocks as a respective one of the delay registers.

8. The method of claim of claim 7, wherein the modifying the circuit design includes instantiating one or more respective register primitives in the circuit design to implement one or more of the delay registers.

9. The method of claim 1, wherein the determining the positions includes determining the positions based at least in part on a total delay between the input and the output of the memory.

10. The method of claim 1, wherein the determining the positions includes determining the positions based at least in part on a total delay between the input and the output of the memory, and a number of intervals between the delay registers.

11. The method of claim 1, further comprising:
generating configuration data after modifying the circuit design; and
configuring a programmable integrated circuit (IC) with the configuration data.

12. A system for pipelining cascaded memory blocks, comprising:
a processor circuit;
a memory arrangement coupled to the processor circuit and configured with instructions that when executed by the processor circuit cause the processor circuit to:
determine a plurality of memory blocks combined to implement a memory in a netlist of a circuit design;
generate, in the memory arrangement from the netlist of the circuit design, a model of the plurality of memory blocks arranged in a matrix having a plurality of columns;
determine a total number of delay registers that can be inserted between an input register and an output register of the memory based on a latency constraint;
determine, for each column of the plurality of columns, positions of the delay registers in the model between an input of the column and the output register of the memory, wherein the positions of the delay registers impose equal latency on paths from the inputs of the columns to the output register of the memory; and
modify the circuit design to include the delay registers at the positions.

13. The system of claim 12, wherein the instructions that cause the processor circuit to determine the plurality of memory blocks that implement the memory include instructions for searching the netlist of the circuit design for at least one vertical cascade connection of memory blocks.

14. The system of claim 12, wherein the instructions that cause the processor circuit to generate the model include instructions that cause the processor circuit to:
generate vertices that represent the input register of the memory, output register of the memory, delay registers, and memory blocks; and
generate edges that connect the vertices and that represent connections between the input register of the memory, output register of the memory, the delay registers, and the memory blocks in the circuit design.

15. The system of claim 12, wherein:
the instructions that cause the processor circuit to determine the plurality of memory blocks that implement the memory include instructions that cause the processor circuit to search the netlist of the circuit design for a horizontal cascade connection of memory blocks; and
the instructions that cause the processor circuit to generate the model include instructions that cause the processor circuit to:
generate vertices that represent the input register of the memory, output register of the memory, delay registers, horizontal cascade connection, and the memory blocks, and
generate edges that connect the vertices and that represent connections between the input register of the memory, output register of the memory, delay registers, and the memory blocks in the circuit design.

16. The system of claim 12, wherein the instructions that cause the processor circuit to determine positions of delay registers include instructions that cause the processor circuit to generate a timing graph having vertices representing the delay registers to be inserted and edges having associated values that represent delays between the delay registers.

17. The system of claim 12, wherein the memory arrangement is further configured with instructions that when executed cause the processor circuit to verify, after determining the positions of the delay registers in the model, equal latencies of paths from the input to the output of the memory.

18. The system of claim 12, wherein the instructions that cause the processor circuit to modify the circuit design include instructions that cause the processor circuit to configure attributes of one or more of the memory blocks to enable a respective built-in pipeline register of the one or more memory blocks as a respective one of the delay registers.

19. The system of claim of claim 18, wherein the instructions that cause the processor circuit to modify the circuit design include instructions that cause the processor circuit to instantiate one or more respective register primitives in the circuit design to implement one or more of the delay registers.

20. The system of claim 12, wherein the instructions that cause the processor circuit to determine the positions include instructions that cause the processor circuit to determine the positions based at least in part on a total delay between the input and the output of the memory, and a number of intervals between the delay registers.

* * * * *